Patented Feb. 1, 1927.

1,616,291

UNITED STATES PATENT OFFICE.

HERMANN WEYLAND, OF ELBERFELD, GERMANY, ASSIGNOR TO WINTHROP CHEMICAL COMPANY, INC., OF NEW YORK, N. Y.

ANTHELMINTIC.

No Drawing. Application filed September 2, 1925. Serial No. 54,133, and in Germany November 21, 1924.

It is already known to use the latex of certain species of Ficus, in particular of *Ficus glabrata*, *Ficus dolearia* and similar allied bodies as an anthelmintic. The tendency of these species of latex, however, to decompose readily, as well as the imperfect means of administering the same, due to the high content of caoutchouc, combined with poor resorption militate against their general application.

The object of the present invention is to obviate these disadvantages. In accordance with my invention the coagulated latex is exhaustively extracted with organic solvents, care being taken to avoid an elevated temperature. The medicinally effective residue from the extraction forms a dry powder, which is soluble in water and has an extraordinarily strong deadly action against intestinal parasites such as worms. Instead of using the coagulated latex, the original latex itself may be extracted with organic solvents and the remaining liquid may then be evaporated while avoiding a higher temperature.

Example.

To 1000 parts by weight of the latex of *Ficus glabrata* 2000 parts by weight of acetone are added, whereby a tough mass is produced. This mass is separated from the supernatant liquid and exhaustively extracted with petrol ether, the temperature not being allowed to exceed 30° C. 87 parts of a dry, friable light brownish coloured powder remain. It is soluble in water and is precipitated on the addition thereto of acetone or alcohol. The mass can also be extracted with another liquid e. g. ether, $CCl_4$, $CHCl_3$, $CS_2$ care being taken that the temperature be not allowed to exceed about 50° C.

I claim:—

1. Process for the manufacture of an anthelmintic which is specifically effective in eliminating worms comprising extracting by means of organic solvents the latex of Ficus and drying the resulting residue.

2. Process for the manufacture of an anthelmintic which is specifically effective in eliminating worms comprising extracting by means of organic solvents the coagulable constituents of the latex Ficus, and drying the resulting residue.

3. An anthelmintic being the residue of extraction, by means of organic solvents, of the latex of Ficus, being a friable slightly brownish colored product, showing useful anthelmintic properties.

In testimony whereof I have hereunto set my hand.

HERMANN WEYLAND.